June 23, 1953 A. G. COOLEY 2,643,173

STYLUS DRIVE FOR FACSIMILE RECORDERS

Filed July 16, 1949 3 Sheets-Sheet 1

INVENTOR.
A. G. COOLEY
BY E. R. Evans
Attorney

June 23, 1953 A. G. COOLEY 2,643,173

STYLUS DRIVE FOR FACSIMILE RECORDERS

Filed July 16, 1949 3 Sheets-Sheet 2

INVENTOR.
A. G. COOLEY
BY E. R. Evans
Attorney

June 23, 1953 A. G. COOLEY 2,643,173

STYLUS DRIVE FOR FACSIMILE RECORDERS

Filed July 16, 1949 3 Sheets-Sheet 3

INVENTOR.
A. G. COOLEY
BY E. R. Evans
Attorney

Patented June 23, 1953

2,643,173

UNITED STATES PATENT OFFICE 2,643,173

STYLUS DRIVE FOR FACSIMILE RECORDERS

Austin G. Cooley, New York, N. Y., assignor to Times Facsimile Corporation, New York, N. Y., a corporation of New York Application July 16, 1949, Serial No. 105,237

20 Claims. (Cl. 346—139)

This invention relates to facsimile recorders of the current-conducting stylus type and more particularly to a continuous or flat-type recorder utilizing an endless carrier or belt for supporting the styli.

Heretofore facsimile recorders having an endless carrier or belt for supporting the styli have employed three equally spaced styli which traverse the recording area successively. The stylus carrier or belt is supported upon a pair of idler pulleys and a rotatable driving element which may be combined with one of the pulleys is employed to propel the belt. The stylus carrier or belt is not uniformly flexible along its length because of the mounting of the stylus carriers on the belt or attached to sections thereof. Therefore, when the point on the belt adjacent the stylus carrier is entering or leaving a drive or idler pulley, there is a small irregularity in the drive and in the load on the driving motor. In a recorder having three styli, this irregularity occurs at the moment when the particular stylus which is recording is between the ends of the recording area. The change in the velocity of the stylus carrier or belt resulting from the abovementioned irregularity in drive results in distortion of the copy. In accordance with a feature of the present invention, this is overcome by employing four or more equally spaced styli, said styli being arranged in relation to the driving elements of the stylus carrier so that any irregularity in drive from the above-mentioned causes occurs before the recording stylus enters or after it leaves the recording area. In this manner the distortion or "jag" resulting from the displacement of the stylus carrier from these causes is obviated.

Another difficulty encountered with stylus recorders of the character described where a pulley or wheel is employed both for supporting and driving the stylus carrier or belt results from the slippage of the belt where it frictionally engages the face of the pulley, which is caused by the positive engagement between one or more teeth on said pulley and the carrier or belt. The slippage results from the fact that it is impossible to construct the supporting pulleys so that the circumference and the spacing between the driving teeth are exactly the same; that is, the drive by the teeth is not the same as the friction drive between the periphery of the pulley and the belt. Even though the parts are constructed with great precision, the slight discrepancy in the dimensions will cause a small amount of slippage which appears as a variation in the load on the motor and produces corresponding "jag" in the recorded copy. In accordance with another feature of the present invention, the driving and supporting functions of the belt pulleys are effected by supporting the belt on idler pulleys, which engage the same at the edges, and independently driving the belt through teeth which are centrally located thereon and narrower than the width of the belt. Thus, one of the idler pulleys may be peripherally slotted or recessed to receive the teeth, the teeth serving to keep the belt from creeping across the face of the idler wheel by engaging the sidewalls of the slot. On the drive pulley a drive member is provided which engages the teeth on the belt, said pulley having, for example, two outside plates or disks for supporting the belt and which are freely movable with respect to the drive member so as to be turned by the frictional engagement with the belt. Thus the belt drive is independent of the support or idler wheels.

Other objects and advantages of the invention will appear from the following description of a preferred embodiment thereof shown in the accompanying drawings, wherein.

Figure 1:
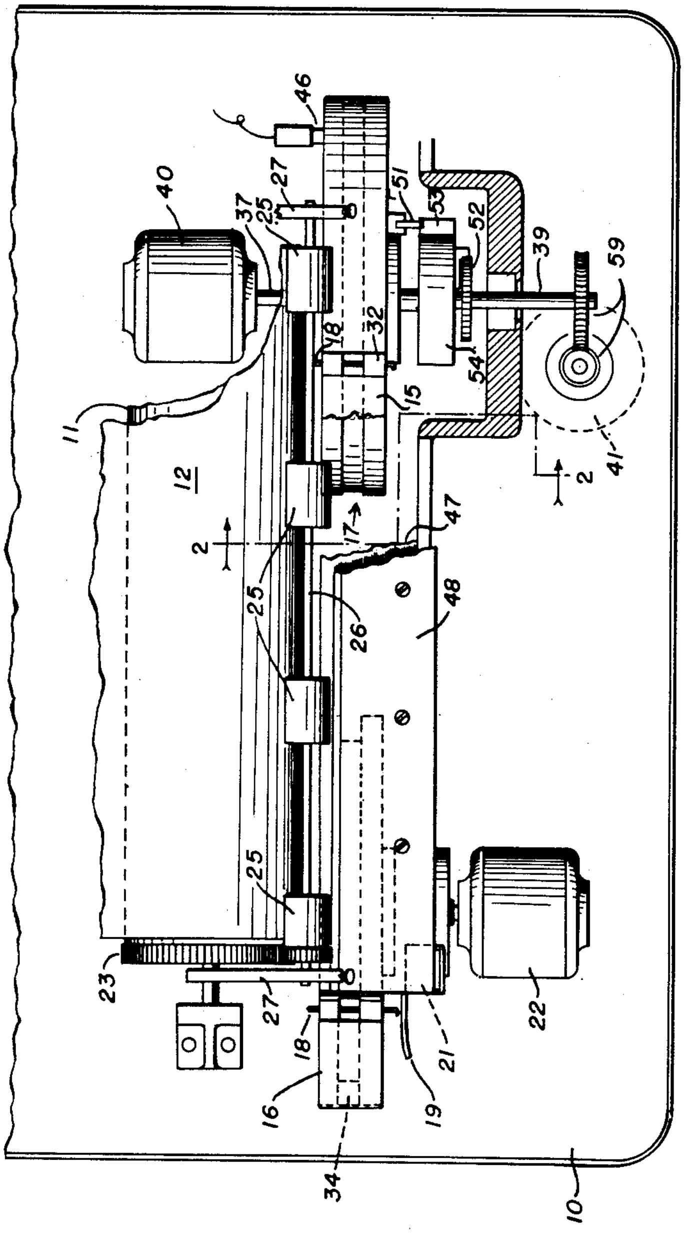
Fig. 1 is a plan view of a facsimile recorder embodying the invention.
Figure 2:
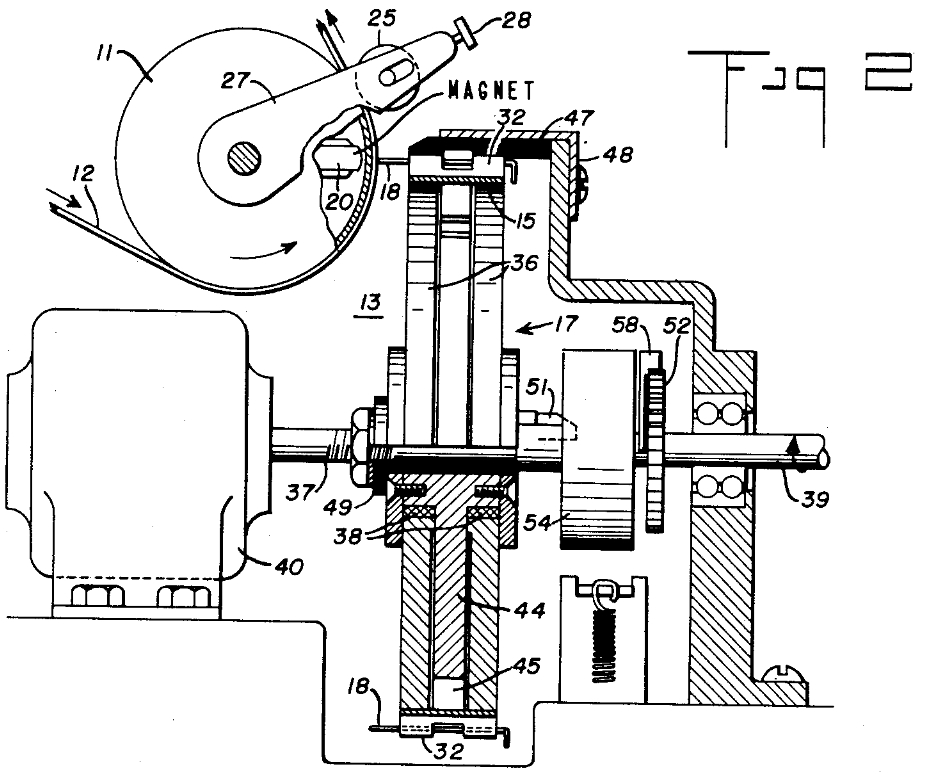
Fig. 2 is a detailed cross-sectional view to an enlarged scale taken on the line 2—2 of Fig. 1.

Referring to Figs. 1 and 2 of the drawings, the recorder shown comprises a base 10 upon which is mounted a paper feed roll 11 adapted to support and feed a recording sheet or continuous web 12 in front of the stylus mechanism indicated generally by reference character 13 in Fig. 2. The stylus recording mechanism comprises an endless stylus carrier or belt 15 carried on a pair of spaced pulleys or wheels 16 and 17 so that a straight span of the belt is adjacent the recording area on the sheet or web 12. In this manner the styli 18 carried by the stylus carrier or belt 15 traverse a straight-line recording path across the width of the recording medium. A stylus guide plate 19 is arranged to position each stylus in its holder as it approaches the recording area. The styli 18 are preferably of steel and held against the surface of the recording sheet at a constant uniform pressure by a stationary magnet 20 inside the feed roll 11 so that the proper recording pressure is maintained in spite of the friction between the stylus and its holder, the wear on the end of the stylus, and so forth. This feature is disclosed and claimed in Patent No. 2,591,138, dated April 1, 1952. A second magnet 21 is provided to lift the point of the stylus momentarily above the edge of the recording sheet, the oscillation of the stylus also serving to prevent it from binding in the holder.

The feed roll 11 is driven through a reduction gear between the motor 22 and the gear 23 on the end of the feed roll. The recording sheet or web 12 is held in frictional engagement with the feed roll 11, as by means of a series of rubber pressure rollers 25 mounted on a common shaft or spindle 26. This spindle may be driven from the gear 23, if desired, and is carried by supporting members 27 pivoted on the shaft of the feed roll 11. The ends of the spindle 26 extend into slots in the arms 27 and a thumbscrew 28 is provided for releasably holding the spindle and pressure rollers 26 in the sheet-engaging position.

An important feature of the invention resides in the supporting and driving means for the stylus carrier or belt 15 which is preferably of resilient metal, such as beryllium copper alloy, and carries four equally spaced drive teeth 31 adjacent the stylus carriers 32. The teeth 31 are narrower than the belt, for example, about one-third the width of the belt as shown in Fig. 2. The idler pulley 16 is provided with a central peripheral recess 34 to receive the belt teeth and prevent positive driving engagement between the idler pulley and the belt. Accordingly, the belt is supported by the idler pulley 16 and merely has frictional contact between the face of the pulley and the inside of the belt 15 so that no irregularity in load resistance occurs as the idler pulley rotates. However, the width of the slot 34 is preferably equal to the width of the teeth 31 to prevent the carrier or belt creeping sidewise on the idler pulley 16.

The drive pulley 17, as shown in detail in Fig. 2, also provides a frictionless support for the outside edges of the belt, this support being constituted by the freely rotatable plates or disc members 36. Preferably these disc members are supported on the hub of the drive shaft 37 with suitable interposed bearings 38. The shaft 37 rotates at synchronous speed to maintain synchronism with the scanning mechanism of the remote transmitter and may be geared or directly connected to a driving motor 40. The drive shaft 37 is further connected through the second shaft 39 to a synchronous motor 41 which is operative to maintain the drive shaft and stylus carrier at synchronous speed during recording as will be explained hereinafter.

Figure 3:
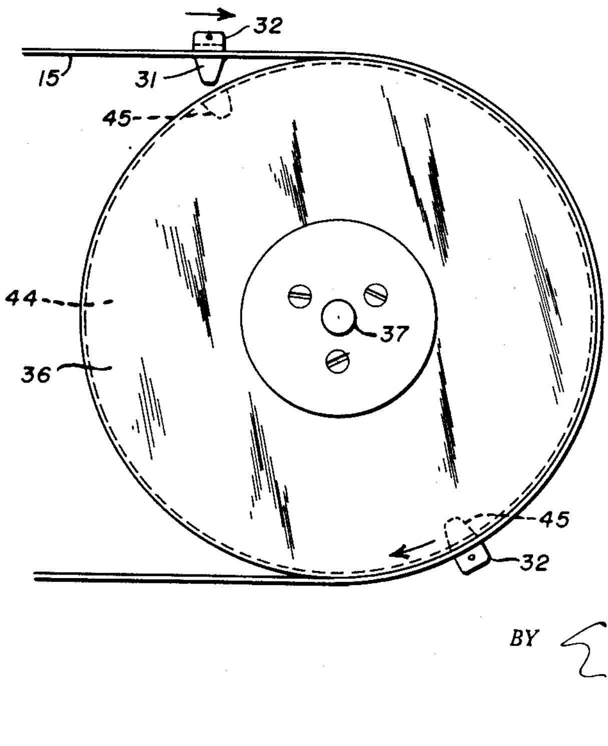
Figs. 3, 4 and 5 are diagrammatic views showing the driving engagement between the belt and drive member.

The drive shaft 37, as shown in Figs. 2 and 3, is bolted or clamped to the rotatable hub of the drive disc 44 which engages the teeth 31 on the belt 15. The drive disc 44 is concentric with and disposed between the freely rotatable idler discs 36 and is cut or formed with teeth or drive elements as indicated at 45 in Fig. 3 to mesh with the drive teeth 31 on the belt. In this manner the driving and supporting functions of the idler and driving portions of the pulley 17 are separated so that the meshing of the teeth and/or the stretching or slipping of the belt on the idler pulley surfaces cannot cause any variation or irregularity of the load resistance to the driving motor. Accordingly, the carrier or belt 15 is propelled smoothly and without any fluctuations which would cause distortion or jag in the recorded copy on account of irregularity in the movement of the styli 18.

Each of the stylus holders 32 preferably comprises a tube which is cut away in the central portion as shown to reduce the friction between the stylus 18 and the bore of the tube. At the recording area, the stylus holders 32 engage a longitudinal guide plate 47 supported on an angular bracket 48 at the front of the recorder. This feature is described and claimed in my co-pending application Ser. No. 105,236, filed July 16, 1949.

Figures 4, 5, 6:
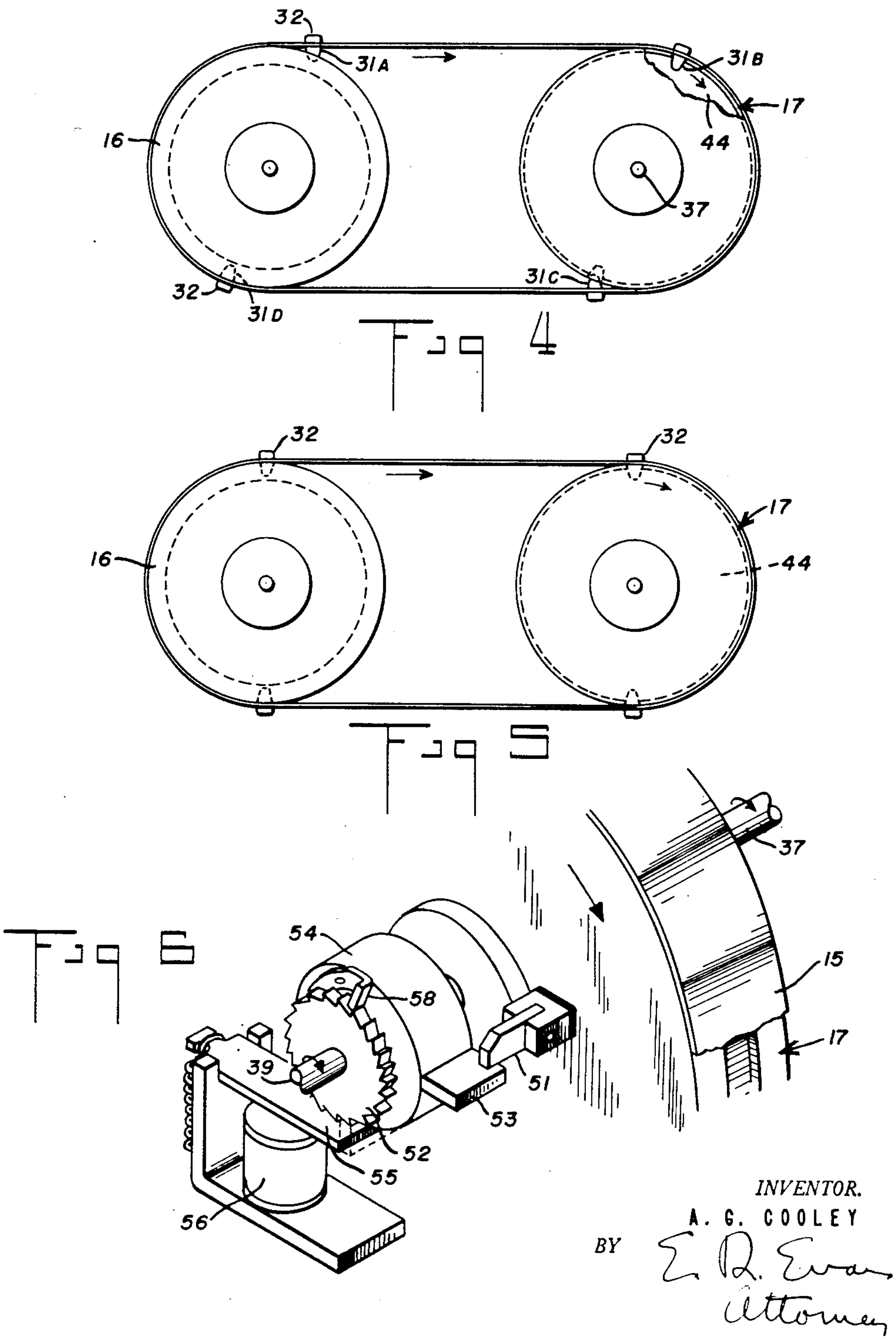
Fig. 6 is a detailed view of a preferred form of synchronous drive and phasing mechanism.

In order to further reduce the effect of irregularity in the drive of the carrier or belt 15, the carrier is preferably provided with four equally spaced teeth 31A, B, C and D as shown in Figs. 4 and 5. Comparing Fig. 4 to Fig. 1, it will be noted that the operating stylus adjacent the drive tooth 31A is approaching the recording area in Fig. 4, or is at the beginning of the recording line. At this time the leading tooth 31B has entered the meshing drive contact with the drive disc 44 and the tooth 31C is out of contact so that any jag which may be produced when the drive is transferred from one tooth to the other occurs at or before the beginning of the recording line. During the recording cycle of one stylus or until the stylus associated with the next tooth 31D approaches the recording line, a uniform drive is assured by continuous engagement of the single tooth 31B with the rotary drive member 44. As shown in Fig. 5, the arrangement and spacing of the teeth on the belt and the drive disc 44 are symmetrical and the circumference of the idler pulleys is equal to twice the spacing between successive stylus holders 32. Obviously the size and spacing of the elements of the drive mechanism as well as the number of teeth, can be varied in accordance with the principles of the invention.

It will thus be seen that the invention provides a simple and efficient drive for obtaining uniform propulsion of recording styli in synchronism with the scanning mechanism of the remote transmitter which is synchronized with the rotative speed of the drive shaft 37. It will be understood that it is not sufficient to adjust the average speed of the recording mechanism to that of the transmitting mechanism, but on the other hand, to obtain substantially distortionless recording of the desired character the rotation of the drive shaft 37 must be held constant and this constant speed imparted to the motion of the styli 38 across the recording area with each successive stylus being indexed properly and tracking in the path of the other styli.

The drive shaft 37 may be driven at constant speed by any suitable synchronous mechanism as well-known in the art. However, it is necessary to phase the drive shaft and stylus carrier with the transmitter unless the phasing is done at the transmitter, and to accomplish this without the necessity of stopping and starting the synchronous motor or using a slip fraction clutch, a drive mechanism is shown similar to that described in my prior Patent No. 2,492,621 dated December 27, 1949. In accordance with this arrangement, the drive shaft 37 is driven by a variable speed motor 40 which tends to rotate the shaft above synchronous speed. The rotative speed of the shaft 37 is held back to synchronous speed by its connection through pivoted latch 51 and ratchet 52 to the shaft 39 of the synchronous motor 41 (see Figs. 2 and 6). The latch 51 is adapted to engage a stop lug 53 which is mounted on a rotatable disk 54 concentric with shafts 37 and 39. The stop lug 53 rotates adjacent the armature 55 of phasing magnet 56 and engages said armature when the phasing magnet is de-energized. When the phasing pulse is received, the armature 55 is attracted, thereby releasing the stop arm 53. The ratchet 52 includes a pivoted spring-pressed pawl 58 carried by the disc 54 and engaging the teeth in the ratchet wheel so as to pick up the stop arm 53 by the continuously rotating synchronous shaft 39 when the phasing pulse is received. The driving motor 40 is then started and since it tends to rotate above synchronous speed, the latch 51 finally engages the stop arm 53 whereupon the drive shaft 37 is held back to synchronous speed by the positive driving engagement of the synchronous motor shaft through the pawl-and-ratchet mechanism. This driving mechanism has several advantages, among which are the fact that the disc 54 carrying the stop arm 53 may be phased independently of the operation of the drive shaft 37 and recorder mechanism. Therefore, the latter may be stopped and started after the phasing has been effected. Furthermore the synchronous motor 41 need not be large enough to drive the recorder through a friction clutch, the power required being supplied principally by the motor 40. The synchronous motor 41 is preferably connected to the drive shafts 37 and 39 through an irreversible worm drive 59 so that excessive torque on the drive shaft 37 will not pull the synchronous motor out of synchronism, as described in my prior Patent No. 2,492,621 referred to above.

The recording current may be applied to the styli 18 in any desired manner, as by contact brushes in the usual manner. If a metallic belt 15 is used, the recording signal voltage may be applied to the idler pulley 17 as by the brush 46 as shown in Fig. 1. The pulley 17 is insulated from the drive shaft and the other elements of the recorder by an insulating sleeve 49.

It will be apparent from the foregoing description that the invention provides a uniform drive mechanism for obtaining improved recording with a plurality of styli upon a sheet or continuous web of recording paper. The elimination of the irregularity in the carrier drive during the recording cycle improves the quality of the recording and permits a higher speed of stylus travel without objectionable distortion.

The invention may be embodied in various forms, in addition to that herein illustrated and described, within the scope of the appended claims.

I claim:

1. In a facsimile recorder having a recording medium in the form of a sheet or continuous web, means for supporting and feeding said sheet or web, an endless stylus carrier or belt provided with spaced driving teeth, a pair of idler pulleys for supporting said carrier or belt for movement adjacent said recording sheet or web, said idler pulleys being recessed to prevent positive driving engagement with said teeth on the stylus carrier or belt, a driving member concentric with one of said idler pulleys and adapted to drive said carrier or belt through engagement with the teeth thereon, spaced styli on said carrier or belt arranged to contact the recording medium and motor means for driving said member and styli in synchronism with the scanning mechanism of the remote transmitter.

2. In a facsimile recorder having a recording medium in the form of a sheet or continuous web, means for supporting and feeding said sheet or web, an endless stylus carrier or belt provided with spaced driving teeth on the inner periphery thereof, a pair of idler pulleys for supporting said carrier or belt for movement adjacent said recording sheet or web, each of said idler pulleys being provided with a peripheral slot in alignment with the teeth on the belt to prevent positive driving engagement with said teeth, the width of said peripheral slot being equal to the width of the teeth to prevent creeping of the belt sidewise on the faces of the pulleys, a rotatable driving member for the belt engaging said spaced driving teeth thereon, said driving member being concentric with the axis of one of said idler pulleys, spaced styli on said carrier or belt arranged to contact the recording medium, each of said styli being mounted adjacent one of the driving teeth, and motor means for driving said member and styli in synchronism with the scanning mechanism of the remote transmitter.

3. In a facsimile recorder having a recording medium in the form of a sheet or continuous web, means for supporting and feeding said sheet or web, an endless stylus carrier or belt provided with four equally spaced driving teeth, a rotary driving wheel engaging the teeth on said carrier or belt, the circumference of said driving member at the pitch diameter being twice the distance between successive teeth whereby the belt is driven through engagement with only one tooth at a time, spaced styli on said carrier or belt arranged to contact the recording medium, each of said styli being mounted adjacent one of said teeth whereby the traverse of a stylus in the straight span of said carrier or belt adjacent the recording medium is effected between the times when a tooth engages and leaves the driving member, and motor means for driving said member and styli in synchronism with the scanning mechanism of the remote transmitter.

4. In a facsimile recorder having a recording medium in the form of a sheet or continuous web, means for supporting and feeding said sheet or web, an endless stylus carrier or belt provided with spaced driving teeth along the length thereof and between the longitudinal edges thereof, a pair of idler pulleys for supporting said carrier or belt for movement adjacent the recording area of said sheet or web, said idler pulleys supporting the edges of the belt and clearing the teeth thereon to prevent positive driving engagement of the carrier or belt thereby, spaced styli on said carrier or belt arranged to contact the recording medium and synchronous driving means journalled on the axis of one of said idler pulleys and engaging the teeth of said carrier or belt to drive the styli across the recording area on said sheet or web in synchronism with the scanning mechanism of the remote transmitter.

5. In a facsimile recorder having a recording medium in the form of a sheet or continuous web, means for supporting and feeding said sheet or web, an endless stylus carrier or belt disposed in front of said sheet or web, a stylus on said carrier or belt, a pair of idler pulleys for supporting said stylus carrier or belt, one of said pulleys including driving means engaging the carrier or belt between the edges thereof to propel the belt in synchronism with the scanning mechanism of the transmitter, said pulley further comprising two freely rotatable discs for supporting the edges of the belt without frictional drive or retardation thereof, and a motor for rotating said driving member.

6. In a facsimile recorder having a recording medium in the form of a continuous sheet or web, means for supporting and feeding said sheet or web, an endless stylus carrier or belt disposed in front of said sheet or web, a stylus supported on said carrier or belt in position to engage the sheet or web and traverse the recording area thereon as the belt moves, means including an idler pulley for supporting said carrier or belt, a rotatable drive member journalled on the axis of said idler pulley for propelling the belt, said drive member and belt having cooperating toothed drive elements, and motor means for driving said member and stylus carrier or belt in synchronism with the scanning mechanism of the remote transmitter.

7. In a facsimile recorder having a recording medium in the form of a sheet or continuous web, means for supporting and feeding said sheet or web, recording mechanism including an endless stylus carrier or belt disposed in front of said sheet or web and a stylus supported on said carrier or belt for engaging the sheet or web, a drive shaft for said recording mechanism and concentric belt driving and supporting members on said drive shaft, said belt and belt driving member having positive driving engagement for propelling the belt in accordance with the rotative speed of the drive shaft, said belt supporting members being freely rotatable on said drive shaft to provide a frictionless support for the belt.

8. A facsimile recorder as set forth in claim 7 in which the supporting members for the belt are arranged to contact the edges of the drive element on the belt to prevent creeping of the belt.

9. A facsimile recorder as set forth in claim 7 in which the drive member of the belt is connected through pawl-and-ratchet mechanism to a synchronous motor and electromagnetic phasing means is provided for the recording mechanism.

10. In a facsimile recorder having a recording medium in the form of a sheet or continuous web, means for supporting and feeding said sheet or web, an endless stylus carrier or belt disposed in front of the sheet or web, two spaced pulleys for supporting said carrier or belt, a plurality of styli on said stylus carrier or belt to record on said sheet or web, and means including a rotatable drive member concentric with one of said pulleys for propelling said carrier or belt by rotation of said one pulley, said drive member having toothed drive elements spaced apart so that the engagement between the drive elements and the belt occurs only at the beginning or end of the recording cycle of each stylus on the recording sheet or web.

11. In a facsimile recorder having a recording medium in the form of a sheet or continuous web, means for supporting and feeding said sheet or web, an endless stylus carrier or belt, a plurality of spaced styli on said carrier or belt in position to engage the surface of the recording medium or record thereon, means including a pivoted idler wheel for supporting said carrier or belt for scanning movement and a pivoted speed-control member concentric with said idler wheel and having toothed positive driving engagement with said carrier or belt.

12. In a facsimile recorder having a recording medium in the form of a sheet or continuous web, means for supporting and feeding said sheet or web, an endless stylus carrier or belt, a plurality of equally spaced styli on said carrier or belt to record on the surface of the recording medium, a wheel having independently rotatable supporting and speed-control members for supporting the belt and holding its speed to synchronous speed and a synchronous drive for said speed-control member to maintain its rotation at synchronous speed, only said supporting member of the wheel having frictional contact with said belt and being pivoted for free rotation at the belt speed.

13. In a facsimile recorder having a recording medium in the form of a sheet or continuous web, means for supporting and feeding said sheet or web, an endless stylus carrier or belt for supporting recording styli, means including an idler wheel for supporting said carrier or belt for progressive movement to carry the styli across the recording area on said sheet or web and a rotatable speed-control member concentric with said idler wheel and free of frictional engagement with said carrier or belt, said speed-control member and belt having positive driving engagement at only one point on the belt during a substantial portion of the stylus scanning movement across the recording area.

14. In a facsimile scanning mechanism employing a movable belt or loop for actuating or propelling a scanning element, means including an idler wheel for supporting said belt or loop and drive means for the belt or loop including a synchronous motor and a rotatable speed-control member concentric with said idler wheel and driven by said motor, said speed-control member having toothed engagement with said belt or loop.

15. In a facsimile machine and the like, a scanning device comprising a band or belt, at least one scanning element on said band or belt, spaced drive elements along the length of said band or belt, and means to support said band or belt with said scanning element adjacent a surface to be scanned thereby, said means including a pair of wheels mounted with their axes in spaced parallelism and around which said band or belt passes, one of said wheels including concentric disc and speed-control members with the band passing around and in contact with the disc member, said members being independently rotatable and said speed-control member having angularly spaced drive elements for registry with the corresponding drive elements on the band or belt.

16. In a facsimile machine and the like, a scanning device comprising a band or belt, at least one scanning element on said band or belt, spaced drive elements along the length of said band or belt, and means to support said band or belt with said scanning element adjacent a surface to be scanned thereby, said means including concentric idler disc and driving members, said driving member engaging the belt only at the drive elements.

17. In a facsimile machine and the like, a canning device comprising an endless belt or carrier, at least one scanning element on said belt or carrier, a plurality of projections or teeth on said belt or carrier and means to support said belt or carrier for progressive movement, said means including a pair of spaced wheels mounted in substantially coplanar spaced relation and around which said belt or carrier passes, one of said wheels including concentric discs of different diameter to support the carrier or belt on the periphery of the larger one of said discs, the other disc being fixed to a driving shaft and engaging the belt only at said projections or teeth.

18. In a facsimile machine and the like, a scanning device comprising a metal belt or carrier, at least one scanning element on said belt or carrier and means for supporting said belt or carrier for progressive movement, said means including substantially coplanar driving and idler wheels engaging said belt, said driving wheel including a member positively engaging said belt to control the progressive movement thereof and also including a disc in frictional contact only with said belt or carrier and freely rotatable with respect to said member.

19. A composite frictional and positive drive arrangement for supporting and driving a facsimile scanning mechanism including a flat belt, comprising a set of three adjacent concentric disc members, the middle disc member being of smaller diameter than the other two members and having positive driving engagement with said belt, the other disc members being mounted for free rotation with respect to said driving disc member and being in frictional contact with said belt.

20. A belt driving mechanism for facsimile machines and the like comprising a flat metal belt carrying a plurality of drive elements or teeth, a wheel around which said belt passes having a peripheral flat surface to frictionally engage the belt, said wheel having mounted for independent coaxial rotation a drive member having a pair of driving elements each having a substantially radial face engaging the drive elements or teeth on the belt, said drive elements extending in different radial directions on said member to register with the driving elements or teeth on the belt and means to drive said member at synchronous speed.

AUSTIN G. COOLEY.

References Cited in the file of this patent

UNITED STATES PATENTS

| Number | Name | Date |
|---|---|---|
| 1,176,149 | Keen | Mar. 21, 1916 |
| 2,278,919 | Erickson et al. | Apr. 7, 1942 |
| 2,329,077 | Nichols | Sept. 7, 1943 |
| 2,355,369 | Finch | Aug. 8, 1944 |
| 2,421,438 | Shonnard | June 3, 1947 |
| 2,437,242 | Cole et al. | Mar. 9, 1949 |
| 2,492,621 | Cooley | Dec. 27, 1949 |

FOREIGN PATENTS

| Number | Country | Date |
|---|---|---|
| 245,410 | Switzerland | July 16, 1947 |